(12) United States Patent
Aragon et al.

(10) Patent No.: US 12,608,766 B2
(45) Date of Patent: Apr. 21, 2026

(54) COMPUTER-IMPLEMENTED METHOD FOR OBTAINING A COMBINED IMAGE

(71) Applicant: Identy Inc., Dover, DE (US)

(72) Inventors: Jesus Aragon, Dover, DE (US); Hardik Gupta, Dover, DE (US)

(73) Assignee: Identy Inc., Dover, DE (US)

( * ) Notice: Subject to any disclaimer, the term of this patent is extended or adjusted under 35 U.S.C. 154(b) by 73 days.

(21) Appl. No.: 18/387,803

(22) Filed: Nov. 7, 2023

(65) Prior Publication Data

US 2024/0428376 A1 Dec. 26, 2024

(30) Foreign Application Priority Data

Jun. 20, 2023 (EP) ...................................... 23180400
Sep. 29, 2023 (EP) ...................................... 23200923

(51) Int. Cl.
G06T 5/50 (2006.01)
G06T 3/00 (2006.01)
(Continued)

(52) U.S. Cl.
CPC .................. G06T 5/50 (2013.01); G06T 3/00 (2013.01); G06T 3/02 (2024.01); G06T 3/40 (2013.01);
(Continued)

(58) Field of Classification Search
CPC .......... G06T 5/50; G06T 7/74; G06T 7/0002; G06T 7/60; G06T 3/02; G06T 3/00;
(Continued)

(56) References Cited

U.S. PATENT DOCUMENTS

| | | | |
|---|---|---|---|
| 4,933,976 A | 6/1990 | Fishbine | |
| 6,094,499 A | 7/2000 | Nakajima | |

(Continued)

FOREIGN PATENT DOCUMENTS

| | | |
|---|---|---|
| JP | 3597148 B2 | 12/2004 |
| WO | 03010707 A1 | 2/2003 |

(Continued)

OTHER PUBLICATIONS

Mohammed Alkhathami et al., "A Mosaic Approach to Touchless Fingerprint Image with Multiple Views", ICDSC 14: Proceedings of the International Conference on Distributed Smart Cameras, Nov. 2014, Article No. 22, pp. 1-8, https://doi.org/10.1145/2659021. 2659065.

(Continued)

*Primary Examiner* — Kenneth B Lee, Jr.
(74) *Attorney, Agent, or Firm* — Lowenstein Sandler LLP

(57) ABSTRACT

A method for obtaining a combined image comprises: obtaining two original images of a user's biometric feature comprising a plurality of characteristics; determining a frequency of the characteristics in the first original image and in the second original image; resizing, based on the determined frequency, the first and/or second original images to obtain a first image and a second image; identifying, in the first image and in the second image, a subset of the plurality of characteristics; for some of the identified characteristics in the first image, identifying corresponding identified characteristics in the second image; deriving an affine transformation for transforming the identified characteristics in the second image into the corresponding identified characteristics in the first image; modifying a portion of the second image using the affine transformation; and obtaining the combined image comprising one portion of the first image and the modified portion of the second image.

20 Claims, 3 Drawing Sheets

(51) Int. Cl.

| | |
|---|---|
| *G06T 3/02* | (2024.01) |
| *G06T 3/40* | (2006.01) |
| *G06T 7/00* | (2017.01) |
| *G06T 7/60* | (2017.01) |
| *G06T 7/73* | (2017.01) |
| *G06V 40/12* | (2022.01) |
| *G06V 40/18* | (2022.01) |

(52) U.S. Cl.

CPC .............. *G06T 7/0002* (2013.01); *G06T 7/60* (2013.01); *G06T 7/74* (2017.01); *G06V 40/1353* (2022.01); *G06V 40/1359* (2022.01); *G06V 40/1371* (2022.01); *G06V 40/193* (2022.01); *G06V 40/197* (2022.01); *G06T 2207/20084* (2013.01); *G06T 2207/20212* (2013.01); *G06T 2207/20221* (2013.01)

(58) Field of Classification Search

CPC ............. G06T 3/40; G06T 2207/20084; G06T 2207/20212; G06T 2207/20221; G06V 40/197; G06V 40/1359; G06V 40/1353; G06V 40/1371

See application file for complete search history.

(56) References Cited

U.S. PATENT DOCUMENTS

| | | | |
|---|---|---|---|
| 6,459,804 | B2 | 10/2002 | Mainguet |
| 7,587,072 | B2 | 9/2009 | Russo |
| 9,684,815 | B2 | 6/2017 | Walch |
| 2004/0125993 | A1 | 7/2004 | Zhao |
| 2004/0151352 | A1 | 8/2004 | Nakajima |
| 2005/0041885 | A1 | 2/2005 | Russo |
| 2005/0100200 | A1 | 5/2005 | Abiko |
| 2008/0317306 | A1 | 12/2008 | Hamilton |
| 2014/0003677 | A1 | 1/2014 | Han |
| 2016/0379038 | A1* | 12/2016 | Vural ................... G06V 10/993 382/125 |
| 2018/0225494 | A1* | 8/2018 | Rhee ................. G06V 40/1365 |
| 2018/0247098 | A1* | 8/2018 | Yoshii ............... G06V 40/1359 |
| 2018/0247105 | A1* | 8/2018 | Riopka ............. G06V 40/1353 |
| 2021/0342967 | A1* | 11/2021 | Popov ................... G06V 40/10 |
| 2023/0419739 | A1* | 12/2023 | Sammoura ......... G06V 40/1353 |

FOREIGN PATENT DOCUMENTS

| | | | |
|---|---|---|---|
| WO | 2005034021 | A1 | 4/2005 |
| WO | 2008155550 | A2 | 12/2008 |
| WO | 2011022186 | A1 | 2/2011 |
| WO | 2016044804 | A1 | 3/2016 |

OTHER PUBLICATIONS

Extended European Search Report Serial No. EP 23 18 0400, dated Nov. 23, 2023, 8 pages.

Extended European Search Report Serial No. EP 23 20 0923 , dated Feb. 28, 2024, 11 pages.

Zhan Xiaosi et al: "Fingerprint Ridge Distance Estimation: Algorithms and the Performance", Jan. 5, 2006 (Jan. 5, 2006), SAT 2015 18th International Conference, Austin, TX, USA, Sep. 24-27, 2015; [Lecture Notes in Computer Science; Lect.Notes Computer], Springer, Berlin, Heidelberg, pp. 294-301, XP047466557, ISBN: 978-3-540-74549-5.

U.S. Appl. No. 18/217,396, filed Jun. 30, 2023, Computer-Implemented Method for Obtaining a Combined Image.

\* cited by examiner

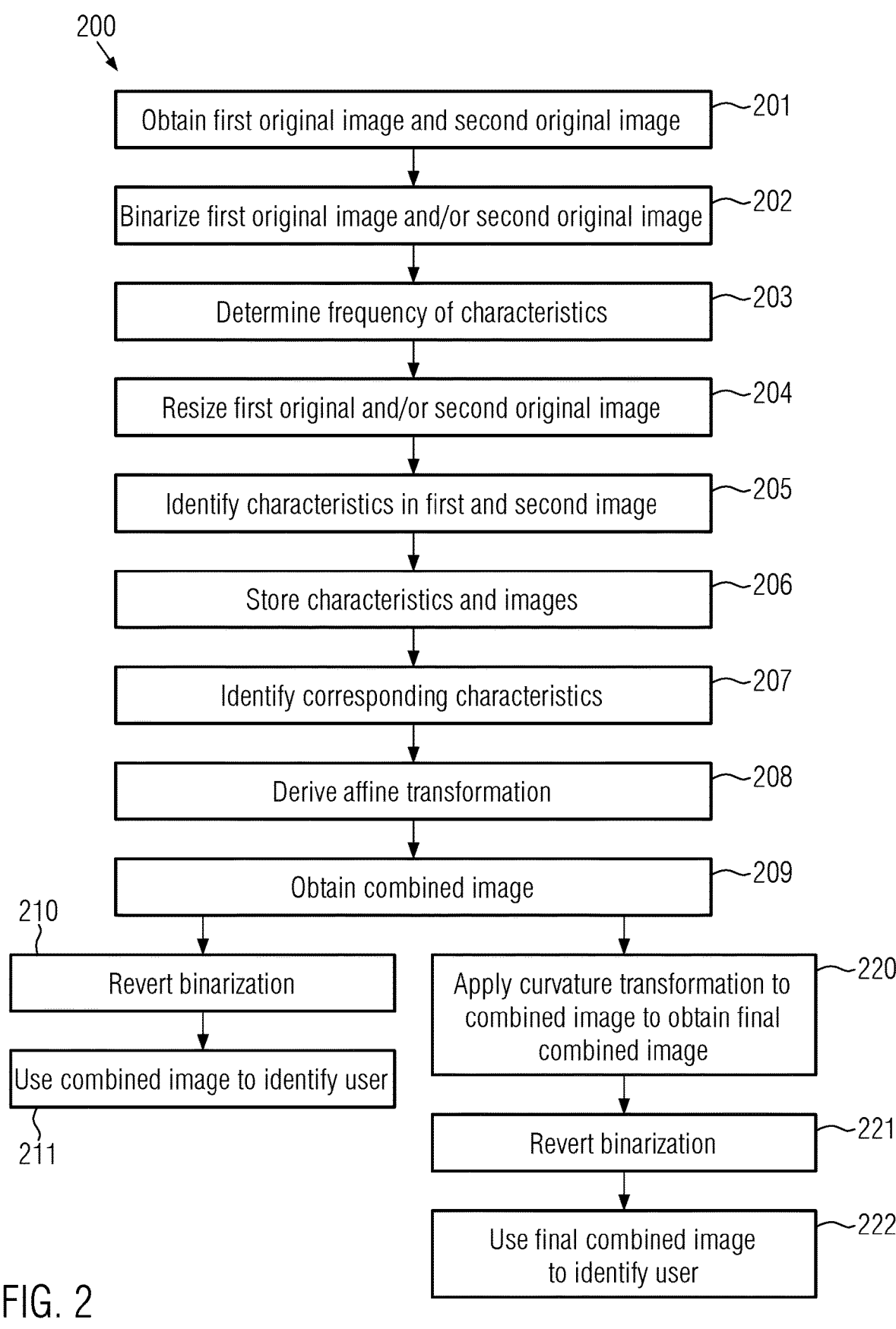

200

Obtain first original image and second original image — 201

Binarize first original image and/or second original image — 202

Determine frequency of characteristics — 203

Resize first original and/or second original image — 204

Identify characteristics in first and second image — 205

Store characteristics and images — 206

Identify corresponding characteristics — 207

Derive affine transformation — 208

Obtain combined image — 209

210

Revert binarization

Use combined image to identify user

211

Apply curvature transformation to combined image to obtain final combined image — 220

Revert binarization — 221

Use final combined image to identify user — 222

FIG. 2

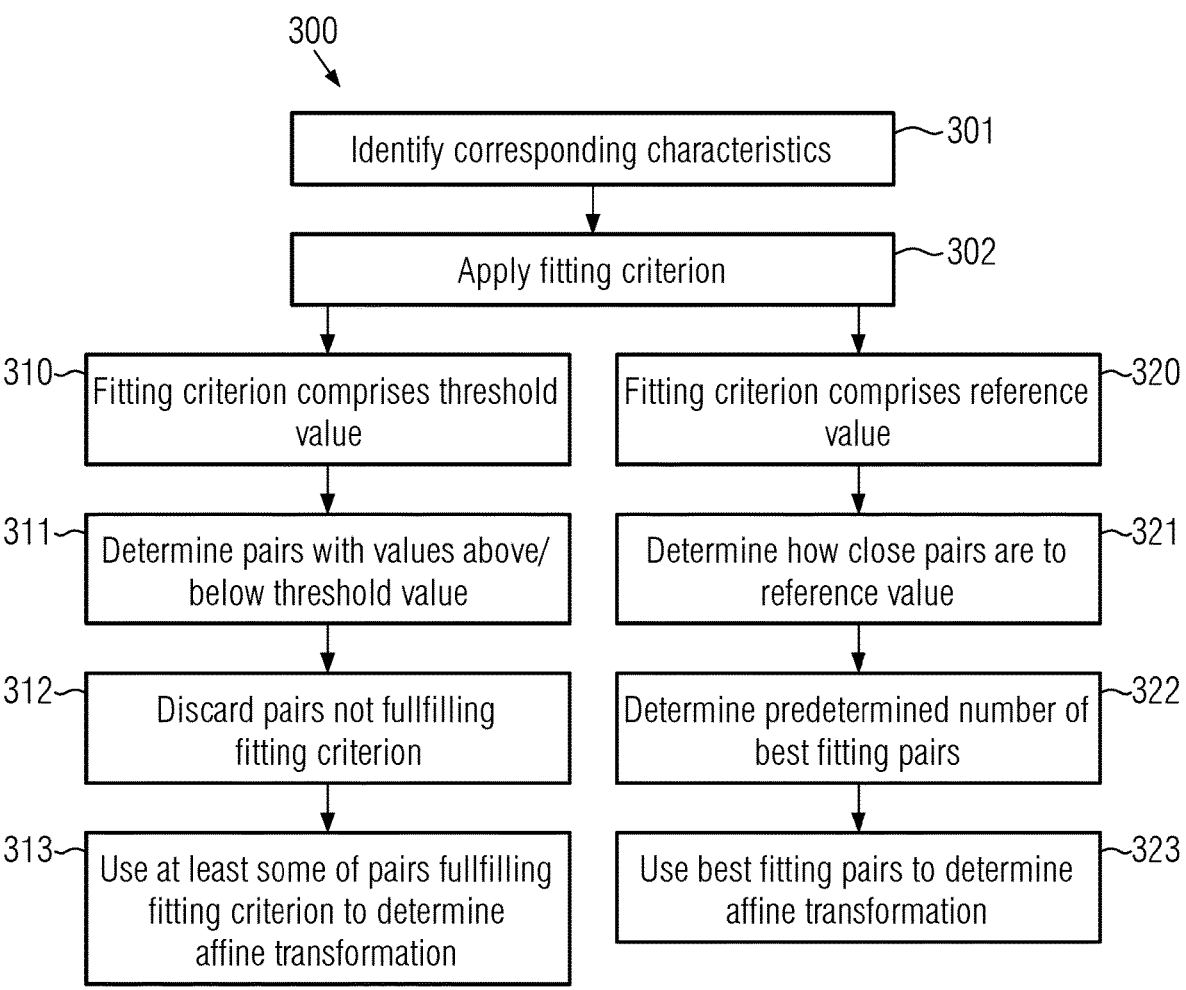

300

Identify corresponding characteristics ~301

Apply fitting criterion ~302

310~ Fitting criterion comprises threshold value

Fitting criterion comprises reference value ~320

311~ Determine pairs with values above/below threshold value

Determine how close pairs are to reference value ~321

312~ Discard pairs not fullfilling fitting criterion

Determine predetermined number of best fitting pairs ~322

313~ Use at least some of pairs fullfilling fitting criterion to determine affine transformation Use best fitting pairs to determine affine transformation ~323

FIG. 3

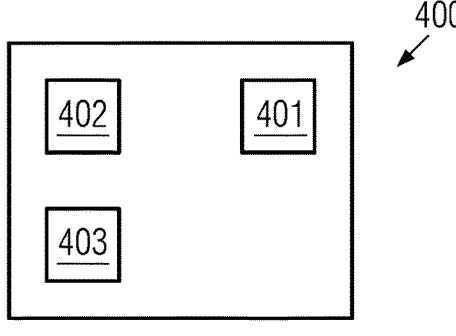

COMPUTER-IMPLEMENTED METHOD FOR OBTAINING A COMBINED IMAGE

RELATED APPLICATIONS

This Application claims the benefit under 35 U.S.C. § 119 (a) of EP patent application Ser. No. 23/200,923.3, filed Sep. 29, 2023, and EP patent application Ser. No. 23/180,400.6, filed Jun. 20, 2023, which are incorporated by reference herein. The present application is related to U.S. application Ser. No. 18/217,396, filed Jun. 30, 2023, which shares a common priority claim with the present application.

TECHNICAL FIELD

The present disclosure relates to a computer-implemented method for obtaining a combined image from two images and a device on which to implement the method.

BACKGROUND

Combining images taken of, for example, different portions of an object like a fingerprint of a user or a face of the user is a commonly known task, particularly in cases where the user is to be identified using respective images. For aligning different portions of an object from different images, the "Ransac algorithm" was developed as explained in a "Mosaic Approach to Touchless Fingerprint Image with Multiple views" by Alkhathami et al.

The method described in the "Mosaic Approach to Touchless Fingerprint Image with Multiple views" is applicable for aligning parts of objects from different images. However, the approach only provides for an approximate aligning of the respective portions of different images. This has drawbacks in the context of identification accuracy if such aligned portions of images are used for identifying a user.

There is consequently a consistent need for improving the creation of combined images, particularly in the context of user identification using several images from the same biometric feature of the user, like his or her fingerprint or his or her eye.

BRIEF DESCRIPTION OF THE DRAWINGS

Embodiments of the present disclosure are illustrated by way of example, and not by way of limitation, in the figures of the accompanying drawings.

FIG. 2 shows a flow diagram of a computer-implemented method, according to one embodiment of the present disclosure.

FIG. 3 shows a flow diagram applying a fitting criterion to determine pairs of characteristics to be used to determine the affine transformation, according to one embodiment of the present disclosure.

FIG. 4 shows a schematic depiction of a device, according to one embodiment of the present disclosure.

DETAILED DESCRIPTION

Figure 1:
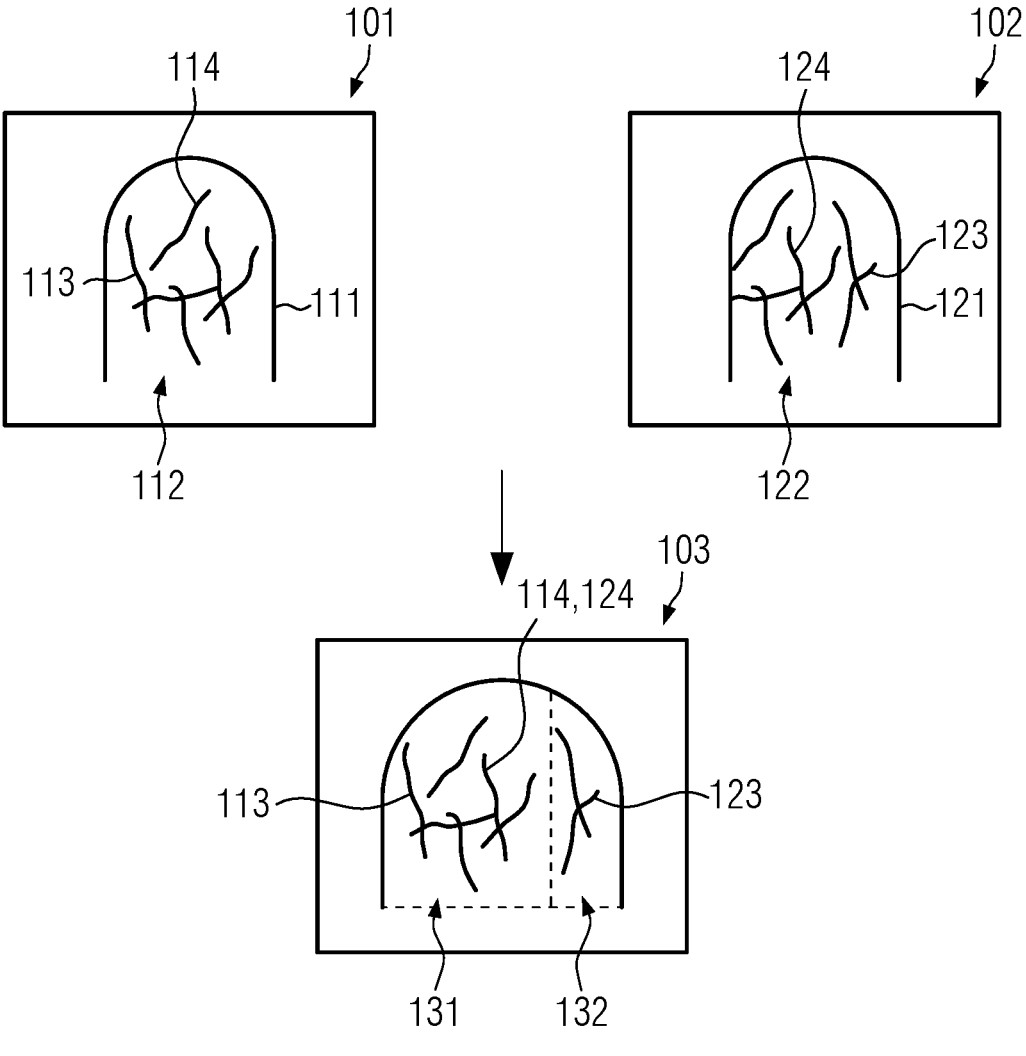
FIG. 1 shows a schematic depiction of images taken and a combined image, according to one embodiment of the present disclosure.

Embodiments of the present disclosure improve the accuracy with which combined images are obtained from at least two images of a biometric feature.

Aspects of the present disclosure describe a computer-implemented method for obtaining a combined image from two images, and a device comprising at least one processor and a memory comprising computer-executable on which to implement the method.

According to one embodiment of the present disclosure, a computer-implemented method for obtaining a combined image from two images is provided, the computer-implemented method comprising: obtaining a first original image and a second original image of a biometric feature of a user, the biometric feature comprising a plurality of characteristics; determining a frequency of at least some of the plurality of characteristics in the first original image and in the second original image; resizing, based on the determined frequency, at least one of the first original image or the second original image to obtain a first image and a second image; identifying, in the first image and in the second image, a subset of the plurality of characteristics; storing the first and second image and the identified characteristics; for at least some of the identified characteristics in the first image, identifying corresponding identified characteristics in the second image; deriving an affine transformation for transforming the at least some of the identified characteristics in the second image into the corresponding identified characteristics in the first image; modifying at least a portion of the second image using the Fourier transformation; and obtaining a combined image comprising at least one portion of the first image and the at least one modified portion of the second image.

The frequency of the at least some of the characteristics in the first original image and the second original image can be obtained by, for example, applying a Fourier transformation to the characteristics or portions of the images in which the respective characteristics are present. For example, distances between characteristics, like for example ridges of a fingerprint, can be transformed by applying a discrete Fourier transformation into the space of reciprocal distances (i.e. "frequencies").

Resizing the first original image and/or the second original image to obtain a first image and a second image can comprise that one of the first or the second image is resized based on the determined frequency. For example, the first image may be maintained in its original size and only the second image may be resized so as to match the frequency determined for the first original image. In other embodiments, only the first original image is resized and the second image is maintained. In other embodiments, both images are resized based on the respective frequency. For example, in one embodiment, it can be provided that at least one of the first and the second original images is resized based on the frequency so as to obtain a resolution of the characteristics that results in a geometric property of the characteristics to fulfil a particular requirement. In the case of the characteristics constituting ridges, for example, the resizing may be done so that a distance between ridges corresponds to a particular dots per inch ("dpi") value such as, for example, 250, 300 or 500 or 650 dpi. Alternatively or additionally, it may be provided that one of the images is resized so that the frequency of the resized image matches the frequency of the other image.

This resizing can constitute a preliminary or approximate matching of the images, in one embodiment.

In case only one of the first or the second original images is resized based on the frequency, the other original image may be maintained identical. In any case, after that step, the first original image and the second original image (irrespective of which them has been resized) are referred to as first and second images.

The affine transformation can comprise movements, rotations, stretchings, or shrinkings, or any combination thereof, of the at least a portion of the second image. Thereby, a more accurate matching of the corresponding portions and the first and second image is obtained so that the combined image is obtained from the first and second image with increased accuracy, allowing for using the combined image for, for example, identifying a user based on the biometric feature.

In one embodiment, the method further comprises obtaining a final combined image, comprising applying a curvature transformation to the combined image.

The curvature transformation can comprise, for example, modifying portions in the combined image so as to more closely match the shape of the three-dimensional object constituting the biometric feature or on which the biometric feature is provided. If, for example, the biometric feature is a fingerprint of a user, the curvature transformation can comprise transforming the combined image so as to more approximately match an image of the whole biometric feature if taken from a particular perspective. For example, the shape of the finger which may be assumed to be generally cylindrical influences how the biometric feature as a whole would appear if a single image of the whole biometric feature were taken from a particular perspective or viewpoint. By applying the curvature transformation to the combined image, this can properly be taken into account, further increasing the identification accuracy. In this context, the first (original) image may be identified as a center image taken from a center region where the finger is photographed from the front and the second image may be a side image that neighbors the center region of the finger and even though obtained from the front, would usually exhibit distortions if taken together with the image of the center region. By applying the curvature transformation, this can be taken into account thereby further increasing the accuracy of the final combined image.

The method can comprise binarizing the first original image and the second original image and determining the frequency of the characteristics from the binarized first image and the binarized second image. Binarizing can comprise obtaining a black/white image. This can improve the accuracy with which the characteristics can be identified for resizing and/or determining the affine transformation.

The method can further comprise using the affine transformation for modifying at least a portion of the second image and obtaining the combined image in a non-binarized state. This can improve the identification accuracy while the accuracy would reach the combined images obtained based on binarized first and second images can be increased.

In one embodiment, the biometric feature is a fingerprint and the plurality of characteristics are minutiae. In one embodiments, the biometric feature is an iris of an eye and the plurality of characteristics are pigments of the iris. For these biometric features, determining a combined image in the manner as provided according to embodiments of the present invention as explained above and below provides improved identification accuracy if the combined image is used for identifying a user.

It can be provided that determining the frequency is performed using first characteristics, and deriving the affine transformation is performed using second characteristics.

The first and second characteristics are preferably distinct from each other so that systematic errors that exist for the first and second characteristics (for example regarding their identification in an image) are not influencing both the resizing step and the determination of the affine transformation so that the overall error of obtaining the combined image can be reduced, thereby further increasing the identification accuracy.

In a more specific embodiment, the biometric feature is a fingerprint and the first characteristics are ridges and the second characteristics are minutiae of the fingerprint.

In one embodiment, deriving the affine transformation comprises determining, based on at least one fitting criterion, a subset of best fitting identified characteristics in the first image and corresponding characteristics in the second image, and using the subset to derive the affine transformation. The fitting criteria can, for example, be a threshold value associated with for example a geometric property of the characteristics or the like. If the characteristics exhibit a property below this threshold value, they may be discarded, whereas characteristics exhibiting a property that exceeds the threshold value can be further used for determining the affine transformation for example because they can be assumed to be more reliable. In this case, the number of characteristics used can either be preset or not. Particularly, all pairs of corresponding characteristics of the first and second image that exceed the threshold value can be used irrespective of their number. It is noted that also the opposite is possible, i.e., only pairs of corresponding characteristics that exhibit values or properties below the threshold value are used for determining the affine transformation and pairs having values above the threshold are discarded. Alternatively, the fitting criterion can be a reference value and those characteristics that exhibit corresponding properties or values that come closer or closest to the reference value can be used. The number of characteristics used can be limited to a particular (for example, preset) number of for example 3, 4, 5 or more, so that those characteristics that most closely come to the reference value are used for determining the affine transformation. In any case, by using such fitting criterion, the affine transformation is obtained with increased accuracy.

In one embodiment, the fitting criterion comprises at least one of a geometric property of the characteristics, a quality of an area comprising at least one of the characteristics. The geometric property can, for example, be a length or angular position or orientation of the characteristics. If the characteristics are, for example, ridges, their length can be used as fitting criterion. If the characteristics are minutiae, their distance can be used as fitting criterion. Particularly, the distance between minutiae in a particular image (first image and/or second image) can be used as geometric property. The fitting criterion can, for example, be a threshold value that indicates a threshold distance between minutiae in a particular image. Minutiae having a distance to each other that is larger than this threshold value can be determined to be used for determining the affine transformation. Minutiae having a distance to each other that is smaller than this threshold value can be determined to not be used for determining the affine transformation. Alternative or additionally, among all minutiae available in the respective image, those can be further used that exhibit the largest distance to each other and that have a matching minutiae in the other image. This is particularly advantageous because the longer the distance between minutiae is, the more reliable, for example, an angle of rotation as one parameter of the affine transformation can be determined.

The quality of the area in which the characteristics are provided can, for example, comprise a uniformity in ridge orientation or a deviation of ridge frequency within or across the respective area. A fitting criterion can be that, for example, the ridge orientation does not change by more than a particular amount or is closest to a particular amount. Alternatively or additionally, the fitting criterion can comprise a deviation in the ridge frequency across the area to be below a particular value or to come closest to a particular value.

Using such criteria can ensure that preferably the most uniform characteristics are used which increases the accuracy in obtaining the affine transformation.

In one embodiment, the subset comprises at least three identified characteristics and at least three corresponding characteristics.

An affine transformation in images (two-dimensional) can have up to five independent variables which comprise a stretching along each dimension (for example x and y axes), a displacement along each direction (x and y axes), and an angle of rotation. Considering that the resizing step equalizes the relative size of the characteristics shown in the images, the stretching can in some cases be omitted so that only three free variables remain for determining the affine transformation. Using at least three identified characteristics and corresponding characteristics in the first and second image to determine the affine transformation thus ensures that the same is determined reliably.

It can be provided that more than three identified characteristics and corresponding characteristics (i.e., more than three pairs of characteristics of the first and second image) are used, where affine transformations are calculated for each group of three pairs. The resulting affine transformation can then be determined as, for example, mean value of the obtained affine transformations which can further improve the accuracy of the affine transformation.

It can be provided that deriving the affine transformation comprises using a neural network to determine at least one value characterizing the transformation. As determining the affine transformation requires the matching of points in images and their respective identification, the use of a neural network can reduce the processing time required. However, instead of using neural networks, the invention also encompasses embodiments where deterministic algorithms are used for each step of the method. In this context, deterministic algorithms are any algorithms that do not make use of a neural network and/or result in a predictable outcome when the input is known.

In one embodiment, identifying the corresponding characteristics is performed iteratively.

Iteratively identifying the corresponding characteristics can comprise using a first identified characteristic in the first image and comparing it to the identified characteristics in the first image until a match is found. Subsequently, a second identified characteristic that is different from the first identified characteristic in the first image is compared to the remaining identified characteristics in the second image until a match is found. This can be performed iteratively until all identified characteristics in the first image are associated with a corresponding characteristic in the second image or until there are no more characteristics identified in the first image or the second image available. For the further process, only matching pairs of identified characteristics in the first image and corresponding characteristics in the second image are used. This takes into account the fact that characteristics can be identified in both the first and the second image that are not present in the second or first image, respectively.

In one embodiment, obtaining the first original image and the second original image comprises using an optical sensor to obtain the first original image and the second original image.

The optical sensor can for example be a camera. The first and/or second image can be obtained using either only the camera and the illumination of the environment or additionally a flashlight associated with the camera can be used to improve the illumination conditions. This can further improve the accuracy with which the combined image can be obtained.

In one embodiment, the method further comprises obtaining a third original image of the biometric feature of the user; determining a second frequency of at least some of the characteristics in the first original image and in the third original image; resizing, based on the determined second frequency, at least one of the first original image or the third original image to obtain the first image and a third image; identifying, in the first image and in the third image, a second subset of the plurality of characteristics; storing the first image and third image and the second subset of identified characteristics; for at least some of the second subset of identified characteristics in the first image, identifying corresponding second subset of identified characteristics in the third image; deriving an affine transformation for transforming the at least some of the second subset of identified characteristics in the third image into the corresponding second subset of identified characteristics in the first image; modifying at least a portion of the third image using the affine transformation; and obtaining a second combined image comprising at least a second portion of the first image and the at least one modified portion of the second image and the at least one modified portion of the third image.

With this embodiment, the combined image exhibits an increased area of the biometric feature and can therefore aid in increasing the identification accuracy.

In a further embodiment, the first original image is a center image of a center region of the biometric feature and the second original image is an image of a first neighboring region of the center region and the third original image is an image of a second neighboring region of the center region, wherein, optionally, the first neighboring region and the second neighboring region are on approximately opposite sides of the center region.

For example, the center image may be an image of a particular region (referred to as center region) of the finger and the second image and the third image may be taken from a region that is adjacent to the center region to the left (second image) and to the right (third image). In some embodiments, the second image may be taken from a neighboring region that is above the center region and third image being taken from a neighboring region that is below the center region can be realized. The neighboring regions may be any arbitrary combinations of left, right, above, or below the center region. Preferably, the first neighboring region and the second neighboring region or the second original image and the third original image do not overlap. Thereby, the amount of redundant information is reduced which can improve the accuracy of obtaining the combined image.

According to the invention, a device is provided that comprises at least one processor and a memory comprising computer-executable instructions that, when executed by the processor, cause the device to execute a computer-implemented method according to any of the above embodiments.

The device can for example be a mobile device like a smartphone or laptop with an integrated optical sensor like a camera and optionally flashlight. With this device, and by employing the inventive computer-implemented method, the accuracy with which combined images can be obtained for identification of users can be increased.

FIG. 1 shows a schematic depiction of a first original image 101 and a second original image 102, that are combined according to embodiments of the present disclosure to form a combined image 103, according to one embodiment of the invention.

The first original image 101 and the second original image 102 comprise, among others, a biometric feature of a user. In the example shown, this biometric feature is a fingerprint 112 of a finger 111 (and correspondingly for the finger 121 and the fingerprint 122 for the second image 102). The biometric feature comprises one or more characteristics 114, 124. At least one or more characteristics may be minutiae or ridges of the fingerprint or, for example if the biometric feature is the iris of a user, pigments of the iris as these are suitable for uniquely identifying the user to which the respective biometric feature belongs.

The first original image 101 and the second original image 102 can be taken by an optical sensor of a computing device (not shown), for example, a camera or the like. The computing device with which the images 101 and 102 have been taken may, for example, be a smartphone or other mobile device, though the present disclosure is not limited in this respect. The first original image and the second original image are taken at different orientations of the finger relative to the optical sensor that took the images. This is only exemplary shown by the particular characteristic 113 (a minutia) that is shown in the first original image 101, but not visible in the second original image 102, whereas in the second original image 102, minutiae 123 are visible that have not been captured by the optical sensor when taking the first original image. The first and second original images, may, for example, be obtained by holding a finger in front of the camera. Due to slight changes in the relative alignment of the finger and the optical sensor, consecutive images like the first original image 101 and the second original image 102 can be taken where generally, one or more characteristics in the first original image are not visible in the second original image and vice versa.

For identification purposes, however, it is preferred that as many characteristics of the biometric feature as possible are available for identification so as to increase the identification accuracy. On the other hand, all biometric features may be preferably represented in a manner where their relative arrangement (like angulation, scaling or the like) correspond to a single "large" image being taken of the biometric feature where all characteristics are visible at once.

For example, a first original image showing a first subset of characteristics taken under a first relative arrangement of the biometric feature and the optical sensor may not simply be placed alongside a second original image that was taken under different conditions and shows different characteristics of the biometric features so as to determine, from all visible characteristics, the identity of the user. This approach may result in a misalignment of the characteristics of the biometric feature of the first original image and the second original image relative to each other that does not correspond to the position of the respective characteristics in the real biometric feature of the user, thereby leading to false identifications, particularly in cases where there are large deviations in the relative alignment of the biometric feature relative to the optical sensor when taking the first and the second original image.

In order to avoid this, the computer-implemented method, according to the embodiments of the present disclosure, obtains, from the first original image 101 and the second original image 102, a combined image 103 where portions of the first original image and portions of a modified second image are stitched together. This is achieved by modifying at least portions of the second image in a way so that the modified portion corresponds, with respect to the arrangement of the characteristic of the biometric feature shown in the portion of the second image, to the position of the characteristic or biometric feature that would have been obtained if the second image were taken under the same conditions (relative arrangement of the biometric feature and optical sensor) as or together with the first original image 101 as a single image.

The combined image 103 may, therefore, be made up from portions of the first original image and portions obtained from modifying the second image, as denoted with 131 and 132. Particularly, the portions of the second image 132 that are modified and added to the first image or portion 131 of the first image, may be those that comprise characteristics 123 that have not been visible in the first image 101.

In total, the combined image does not only comprise those characteristics 114 and 124 of the biometric feature that are visible in both images, but also comprises the characteristics 113 that are only visible in the first original image 101 and the characteristics 123 that are only visible in the second original image 123. Thereby, the number of characteristics of biometric feature that are visible and properly aligned to each other in the combined image is preferably larger than the number of characteristics visible in either the first original image or the second original image, allowing for using more characteristics of the biometric feature, for, for example, identifying a user.

FIG. 2 shows a flow diagram of a computer-implemented method 200 for obtaining a combined image from first and second original images (such as images 101 and 102 referred to above with respect to FIG. 1) and use of this combined image to identify a user, according to one embodiment of the present disclosure.

The method begins in step 201 in which first and second original images are obtained from a biometric feature of a user. The first and second original images may, for example, be taken from a fingerprint (as biometric feature) of a user using a camera of a mobile device like a smartphone. The first and second original image are, without limitation, images taken from different portions of the biometric feature that have characteristics (like ridges or minutiae). For example, the first original image may be taken from the fingerprint of a user from a first direction and the second original image may be taken from the fingerprint of a user from a second direction so that (see description of FIG. 1) both images may exhibit some corresponding portions or overlapping portions of the biometric feature but are not identical so that some portions of the biometric feature present in the first original image are not present in the second original image and vice versa.

It can be provided that the first and second original image are stored, for example, in a memory associated with or provided in a device performing the method. For example, the first and second original image may be stored in a non-volatile memory of the smartphone with which the first and second original image have been obtained. This, however, is not necessarily the case, and the first and second original image may instead only be stored in a volatile memory for further processing.

In a next optional step 202, the first and/or second original image may be binarized. The first and second original image will usually be taken as full color image. Binarization can comprise transforming the first and/or second original image to a black and white image, respectively, which can increase the accuracy with which the further steps of the method according to FIG. 2 can be performed because, for example, for neural networks it is easier to determine features in an image where the contrast is comparably high. This is achieved by binarizing the respective images. However, the step 202 is only optional and the method can also proceed without further binarizing the respective images.

In step 203, frequencies of at least some of the characteristics in the first original image and in the second original image are identified either from the original images or from the binarized original images. The determination of the frequency of the characteristics encompasses firstly an identification of the position of the respective characteristics and secondly application of a (discrete) Fourier transformation of the image information. A Fourier transformation can comprise fully applying a Fourier transformation to the first and second original images. This will result in a sum of frequency contributions that together form the image information in the space of frequencies. The connection between the frequency space and the original space of the first and second original images is known to the skilled person.

The characteristics used for determining the frequency can, for example, be the ridges provided in a fingerprint of a user.

It can be provided that only the first and second and/or first to third terms of the Fourier transformation (particularly the first summands of a discrete Fourier transformation, i.e. the highest order contributions in the Fourier transformation) are used in the transformation because lower order summands (corresponding to even higher frequencies) typically provided less absolute value to the Fourier transformation and are only representative of minor fluctuations compared to the preceding summands.

Having determined the frequency of the characteristics in step 203, the first original image and/or the second original image is resized in step 204. This resizing is based on the frequency determined in step 203. If, for example, the distance of the ridges of a fingerprint is used to determine a frequency of a respective characteristic, it can be provided that the resizing of the first and/or second image is performed so that the ridge distance may, for example, correspond to a given dots-per-inch ("dpi") value. The dpi value may, for example, be 200 or 250 or 400 or 500 or 600 dpi. Generally, the dpi value is arbitrary but fixed and can be determined based on other needs, like for example, the overall size of the image to be processed for identifying a user with sufficient accuracy.

Based on the Fourier transformed ridge distance of the first and/or second original images (or other Fourier transformed characteristics), it can then be determined whether resizing is to be applied to the first original image or the second original image only, or to both the first and second image. The resizing allows for properly matching to the characteristics and the first or second original image, thereby providing for a first matching of the first and second original image at least with respect to their size or the size of the characteristics of the biometric features. This step advantageously reduces mismatches of the first and second original image that, for example, originate from different distances of the biometric feature to the camera with which the respective image is taken.

After the resizing step 204, the first original image and the second original image, or at least one of them, has been modified by resizing so that for the further steps of the method, reference will be made to a "first image" corresponding to the optionally resized first original image and a "second image" corresponding to the optionally resized second original image. It is noted that the reference to the first and second image does not necessarily imply that a resizing has been performed on the respective image. However, as a resizing may have been performed, for ease of understanding, it is referred to first and second images to take this into account.

In the first and second image, characteristics of the biometric feature are identified in step 205. For example, minutiae of a fingerprint may be identified in the first and second image. This can be done using algorithmic identifiers for identifying specific portions of images or using a neural network that is specifically adapted and trained for identifying characteristics in images. Such a neural network may, for example, have been trained with commonly available training data from publicly available sources on biometric features like for example fingerprints or eyes of a user (particularly pigments of the iris and the iris itself).

It can be provided that the characteristics or the kind of characteristics identified in step 205 are the same as those used in step 203 for determining the frequency of the characteristics. For example, both in steps 203 and 205 ridges of a fingerprint may be the characteristics that are identified and further used in the process. However, in order to avoid, for example, the same systematic errors in identifying a particular characteristic to have impact on both the frequency determination and the further processing following step 205, it can be provided that in step 203 first characteristics (for example the ridges and their distance) are used whereas in step 205 second characteristics which are different from first characteristics are used. For example, in step 205, if the biometric feature is a fingerprint, it may be preferred that minutiae are identified whereas in step 203 ridges are used. Thereby, the characteristics identified in step 205 that are used for further processing the images are different and therefore independent from those used for determining the frequency which can result in an improved accuracy in obtaining a combined image and can additionally improve the identification accuracy obtainable with the combined image.

In step 206, after having identified characteristics in the first and second image, respectively, the characteristics and the first and second images may preferably be stored in a non-volatile storage (like a non-volatile storage of the device with which the method is performed or an associated storage). The characteristics associated with the first image can be stored in a data structure associated with the first image (for example by using a pointer) and the same can be performed for the characteristics identified in the second image. The characteristics identified in the first and second image, however, are not linked to each other but are, until step 206, independent.

In step 207, corresponding characteristics in the second image that correspond to characteristics identified in the first image are identified.

As explained previously, the first and second images do at least partially overlap and so there will be identified characteristics in the first image that have corresponding identified characteristics in the second image. In step 207, those corresponding characteristics are identified.

This can be done in an iterative manner. For example, step 207 may comprise selecting a first identified characteristic in the first image and attempting to match (using for example a neural network or a deterministic algorithm) identified characteristics in the second image. Once a match is found, a pair of corresponding characteristics can be stored, or the identified characteristic in the first image and the corresponding identified characteristic in the second image can be associated with each other by, for example, a pointer or other data structure.

Subsequently, a second identified characteristic in the first image can be selected and a match can be attempted to the remaining identified characteristics in the second image. Once a match is found, the pair of corresponding characteristics can be stored or associated with each other. This iterative process can be repeated until there are no more identified characteristics in the first image or no more identified characteristics in the second image left or no further matching pairs are identified. In this context, it is noted that in both the first and the second image there may be identified more characteristics than are present in an overlapping region of the first image and the second image. Therefore, there may be identified characteristics in the first image and in the second image for which no corresponding characteristic can be identified in the other image, respectively.

At the end of step 207, there are provided pairs of corresponding characteristics identified in the first and second image that basically constitute an overlapping region of the first and the second image.

In the next step 208, these characteristics are used to derive an affine transformation for transforming at least some of the identified characteristics in the second image into the corresponding identified characteristics in the first image. As the first image and the second image have, for example, been taken from different angles, even though corresponding characteristics can be identified, they are not in the same angular position or are otherwise deformed compared to the first image. An affine transformation that can comprise rotation and/or movements and/or stretching by a particular factor allows for transforming the characteristics of the second image into corresponding identified characteristics in the first image. By using the identified characteristics in both the first and second image that correspond to each other, this affine transformation can be determined.

It can be particularly advantageous to use at least three pairs of corresponding characteristics in the first and second image because an affine transformation (without stretching) can have three freely selectable or independent parameters (displacement or movement along two independent axes like for example the x and y axes and an angle of rotation). An additional free parameter or two additional free parameters refer to stretching of the second image compared to the first image along the two independent axes (like x and y axes) by a given scalar factor. Such stretching can, however, be obsolete because of the resizing already done in step 203. If some stretching is necessary to obtain an accurate affine transformation, then five independent parameters would be available and instead of at least three pairs, at least five pairs of corresponding characteristics may be used.

Once the affine transformation has been determined in step 208, this affine transformation can be used to modify at least a portion of the second image using the affine transformation and obtaining a combined image comprising at least one portion of the first image and the at least one modified portion of the second image in step 209. Combining the portion of the first image and the modified portion of the second image can also be referred to as "stitching" together the first and second image. The step 209 can preferably comprise that only those portions of the second image that are not present in the first image are modified and added to the first image so as to obtain a combined image that is larger than the first image.

The obtained combined image can optionally be de-binarized or the binarization can be reverted in step 210 by, for example, using the pixel information of the combined image that is obtained from the first and the second image that have been resized and potentially binarized either based on the first and second original images or by simply de-binarizing the respective pixels based on the originally available information. This step is, however, only optional and can be omitted. Subsequently, in step 211, the combined image can be used to identify a user.

Alternatively, the following approach can be taken.

The obtained combined image constitutes a combination of images that have been taken under particular directions and/or conditions of a three-dimensional object like, for example, a fingerprint on a finger of a user. Insofar, the combined image more or less corresponds to a rolling off of the biometric feature (like a fingerprint) on a flat surface. The real finger, however, rather corresponds to a cylinder and if a single image were taken of this finger with the fingerprint thereon, it would exhibit distortions and deformations at regions that are not close to the center line of the direction from which the image was taken.

In order to take into account for such curvature deformations, a curvature transformation can be applied at least to some portions of the combined image. If for example the first image is considered as a "center image", only those portions that are added to this first image from the modified second image can be further modified by applying a curvature transformation to obtain a final combined image.

Either after applying this curvature transformation or before that, it can be provided that the binarization is reverted in step 221 (like in step 210). Having obtained the final combined image, it can be used in step 222 for identifying a user.

While the method according to the above embodiments was described with respect to using only a first and second image, the invention is not limited in this respect and more than a first and a second image, particularly at least three images of the biometric feature of the user can be used and a combined image or a final combined image (see step 220) can be obtained therefrom in order to optionally identify a user using the combined or final combined image.

In so far, the approach using a third image in addition to the first and second images already previously discussed is essentially the same as outlined above.

In the case where more than two images are used, it can be provided that one of the plurality of images is selected as a "center image". This can be, for example, the first image. The processing of the third image relative to the first image is done in the same way as for the second image without there being any interaction to the processing of the second image, and the third image (which preferably is taken from a portion of the biometric feature that is fully different to the portion of the biometric feature of the second image) is combined with the first image by modifying at least a portion of this third image that is preferably not present in the first image in the manner as described above.

In one embodiment, it can be provided that the first image is a center image of a center region of the biometric feature and the second and third image are images of neighboring regions of this center region of the biometric feature. For example, the second and third image may be taken from regions to the right and the left, respectively, of the center region, or to the top and the bottom, respectively, of the center region. The invention is not limited in this respect, and also neighboring regions that are on their own adjacent to the center region can be used and combined with the first image to obtain a combined image.

As explained in relation to step 208, deriving the affine transformation comprises using at least some pairs of corresponding characteristics of the first image and the second image identified in step 207. In order to increase the accuracy with which the affine transformation is obtained, it is preferred to use characteristics that exhibit particular properties if such properties are indicative of an improved accuracy of the derived affine transformation compared to using other matching pairs of characteristics.

In order to ensure that preferably the best pairs of corresponding identified characteristics are used, it can be provided that the pairs of identified characteristics of the first and second image are discriminated by using at least one fitting criterion. This method is described in relation to FIG. 3. It is noted that the embodiment of FIG. 3 can take place between step 207 and step 208.

FIG. 3 shows a flow diagram applying a fitting criterion to determine pairs of characteristics to be used to determine the affine transformation, according to one embodiments of the present disclosure. After having identified the pairs of corresponding characteristics 301 in both the first and second image, a fitting criterion can be applied to the pairs of corresponding characteristics in step 302.

In a first embodiment, the fitting criterion comprises a threshold value 310. This threshold value can, for example, be indicative of or be a geometric property associated with the characteristics. For example, if the characteristics are ridges, the fitting criterion can be a length of the ridges or a value specific to the orientation of the ridges, like an angle of inclination compared to a particular reference direction. The threshold value can, for example, indicate a minimum value or a maximum value that the characteristics should have in order to discriminate between pairs of corresponding characteristics that are further used for determining the affine transformation or for discarding the respective pairs if the criterion is not met.

For example, it may be provided that only pairs of characteristics that exceed the threshold value will be further used to determine the affine transformation (alternatively it is of course envisaged that only pairs of corresponding characteristics that exhibit a property that is below the threshold value may be used).

In step 311, a determination is made which of the identified pairs of corresponding characteristics have values (for example, the ridge length) that are above or below the respective threshold value. In the case where only pairs that exhibit a geometric property that lies above the threshold value defined by the fitting criterion are used further, pairs that exhibit a geometric property that is below the respective threshold value can be discarded in step 312. They can nevertheless be maintained or stored but are not further used to determine the affine transformation.

In the next step, only those pairs that fulfil the fitting criterion are used to determine the affine transformation in step 313. This can comprise using all pairs that fulfil the fitting criterion or using only as many pairs as are necessary for determining the free variables of the affine transformation.

Alternatively or additionally, it may also be provided that for determining the affine transformation, if there are more pairs identified to fulfil the fitting criterion than there are free variables for the affine transformation, subsets of these pairs are used that are different from each other with respect to at least one pair in the subset and preliminary affine transformations are calculated for each of those subsets.

For example, if the affine transformation has three freely selectable and independent parameters that are to be determined using the pairs of corresponding characteristics, it can be provided that subsets of three pairs of corresponding characteristics that are all pair-wise disjoint are determined, where the subsets are different to each other by at least one of the pairs of corresponding characteristics. The preliminary affine transformations determined for each of these subsets can then be further used to calculate the affine transformation by, for example, using a mean value of the parameter values obtained for the respective preliminary affine transformations. Thereby, slight distortions or deviations that were introduced by a particular selection of particular pairs of corresponding characteristics are compensated, thereby increasing the accuracy of the affine transformation.

In another embodiment, it can be provided that the fitting criterion comprises a reference value (see 320). The reference value can be a value that is indicative of whether a pair of corresponding characteristics would result in a reliable determination of an affine transformation. This reference value or this fitting criterion can be the same as described in step 310 though it is not used for discriminating between pairs of corresponding characteristics that exhibit values below or above this reference value but is used in step 320 in order to determine which of the pairs of corresponding characteristics come closest to the reference value. In step 321, for example, the Euclidean distance of the property of the pair of corresponding characteristics to the reference value can be calculated for each of the available pairs of corresponding characteristics.

In step 322, a predetermined number of pairs that come closest to the reference value (i.e. have the smallest Euclidean distance) can be selected from among all pairs of corresponding characteristics. In step 323, these pairs which may be regarded as the best fitting pairs among all pairs of corresponding characteristics can then be used to determine the affine transformation. The number, however, does not need to be predetermined.

The pre-determined number used in step 322 can be set as equal to the number of free parameters of the affine transformation to be determined.

However, like for the alternative approach using threshold values as fitting criterions, it can also be provided that the predetermined number is larger than the number of freely selectable parameters in the affine transformation and (as explained above) subsets of pairs of corresponding identified characteristics can be used to determine preliminary affine transformations and derive a final affine transformation therefrom.

Once the affine transformation has been determined, it can then be used in step 209 to obtain the combined image as already explained in relation to the embodiments of FIG. 2.

FIG. 4 exemplarily depicts a device 400 that can be used for carrying out the method according to any of the above-described embodiments. The device 400 comprises at least a processor 401 and associated (preferably non-volatile) memory 402. The associated memory 402 may also be remote (outside the device 400) to the device 400 comprising the processor 401, but in any case a connection between the processor and the memory is provided that allows for obtaining instructions from the associated memory 402 to carry out a method according to any of the above embodiments. Additionally, the device 400 may comprise an optical sensor 403 like a camera for obtaining the first and second image. A flashlight may be associated with the camera allowing for using flash when taking any of the above referred to first, second, or third original images.

However, this is not mandatory and, as explained above, the device carrying out the method according to any of the above embodiments not necessarily is the same device that takes the first and second image. Rather, the first and second image may also be provided from another device via a collection for data transfer (wired or wireless).

It is to be understood that the above description is intended to be illustrative, and not restrictive. Other embodiments will be apparent upon reading and understanding the above description. Although embodiments of the present disclosure have been described with reference to specific example embodiments, it will be recognized that the present disclosure is not limited to the embodiments described, but can be practiced with modification and alteration within the spirit and scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A computer-implemented method for obtaining a combined image from two images, the computer-implemented method comprising:
  obtaining a first original image and a second original image of a biometric feature of a user, the biometric feature comprising a plurality of characteristics;
  determining a frequency of at least some of the plurality of characteristics in the first original image and in the second original image;
  resizing, based on the determined frequency, at least one of the first original image or the second original image to obtain a first image and a second image;
  identifying, in the first image and in the second image, a subset of the plurality of characteristics;
  storing the first image, the second image and the identified characteristics;
  for at least some of the identified characteristics in the first image, identifying corresponding identified characteristics in the second image;
  deriving an affine transformation for transforming the at least some of the identified characteristics in the second image into the corresponding identified characteristics in the first image;
  modifying at least a portion of the second image using the affine transformation; and
  obtaining the combined image comprising at least one portion of the first image and at least the modified portion of the second image.

2. The computer-implemented method of claim 1, further comprising:
  obtaining a final combined image by applying a curvature transformation to the combined image.

3. The computer-implemented method of claim 1, further comprising:
  binarizing the first original image and the second original image, wherein the frequency of the at least some of the plurality of characteristics is determined from the binarized first image and the binarized second image.

4. The computer-implemented method of claim 1, wherein the biometric feature is a fingerprint and the plurality of characteristics are minutiae, or wherein the biometric feature is an iris of an eye and the plurality of characteristics are pigments of the iris.

5. The computer-implemented method of claim 1, wherein determining the frequency is performed using first characteristics and wherein deriving the affine transformation is performed using second characteristics.

6. The computer-implemented method of claim 5, wherein the biometric feature is a fingerprint and the first characteristics are ridges and the second characteristics are minutiae of the fingerprint.

7. The computer-implemented method of claim 1, wherein deriving the affine transformation comprises:
  determining, based on at least one fitting criterion, a subset of best fitting identified characteristics in the first image and corresponding characteristics in the second image, wherein the subset is used to derive the affine transformation.

8. The computer-implemented method of claim 7, wherein the fitting criterion comprises at least one of a geometric property of the characteristics, or a quality of an area comprising at least one of the characteristics.

9. The computer-implemented method of claim 7, wherein the subset comprises at least three identified characteristics and at least three corresponding characteristics.

10. The computer-implemented method of claim 1, wherein deriving the affine transformation comprises using a neural network to determine at least one value characterizing the transformation.

11. The computer-implemented method of claim 1, wherein identifying the corresponding characteristics is performed iteratively.

12. The computer-implemented method of claim 1, wherein obtaining the first original image and the second original image comprises using an optical sensor to obtain the first original image and the second original image.

13. The computer-implemented method of claim 1, further comprising:
  obtaining a third original image of the biometric feature of the user;
  determining a second frequency of at least some of the plurality of characteristics in the first original image and in the third original image;
  resizing, based on the determined second frequency, at least one of the first original image or the third original image to obtain the first image and a third image;
  identifying, in the first image and in the third image, a second subset of the plurality of characteristics;
  storing the first image, the third image and the second subset of identified characteristics;
  for at least some of the second subset of identified characteristics in the first image, identifying a corresponding second subset of identified characteristics in the third image;
  deriving a second affine transformation for transforming the at least some of the second subset of identified characteristics in the third image into the corresponding second subset of identified characteristics in the first image;
  modifying at least a portion of the third image using the second affine transformation; and
  obtaining a second combined image comprising at least a second portion of the first image, at least the modified portion of the second image and at least the modified portion of the third image.

14. The computer-implemented method of claim 13, wherein the first original image is a center image of a center region of the biometric feature and the second original image is an image of a first neighboring region of the center region and the third original image is an image of a second neighboring region of the center region, wherein the first neighboring region and the second neighboring region are on approximately opposite sides of the center region.

15. A device comprising at least one processor and a memory comprising computer-executable instructions that, when executed by the processor, cause the device to perform operations comprising:

obtaining a first original image and a second original image of a biometric feature of a user, the biometric feature comprising a plurality of characteristics;

determining a frequency of at least some of the plurality of characteristics in the first original image and in the second original image;

resizing, based on the determined frequency, at least one of the first original image or the second original image to obtain a first image and a second image;

identifying, in the first image and in the second image, a subset of the plurality of characteristics;

storing the first and second image and the identified characteristics;

for at least some of the identified characteristics in the first image, identifying corresponding identified characteristics in the second image;

deriving an affine transformation for transforming the at least some of the identified characteristics in the second image into the corresponding identified characteristics in the first image;

modifying at least a portion of the second image using the affine transformation; and obtaining a combined image comprising at least one portion of the first image and at least the modified portion of the second image.

16. The device of claim 15, wherein the operations further comprise:

obtaining a final combined image by applying a curvature transformation to the combined image.

17. The device of claim 15, wherein the operations further comprise:

binarizing the first original image and the second original image, wherein the frequency of the at least some of the plurality of characteristics is determined from the binarized first image and the binarized second image.

18. The device of claim 15, wherein deriving the affine transformation comprises:

determining, based on at least one fitting criterion, a subset of best fitting identified characteristics in the first image and corresponding characteristics in the second image, wherein the subset is used to derive the affine transformation.

19. The device of claim 18, wherein the fitting criterion comprises at least one of a geometric property of the characteristics, or a quality of an area comprising at least one of the characteristics.

20. The device of claim 15, wherein deriving the affine transformation comprises using a neural network to determine at least one value characterizing the transformation.

* * * * *